June 25, 1940.  D. C. SCOTT  2,205,579
TESTING MACHINE
Filed Dec. 7, 1937     5 Sheets-Sheet 3
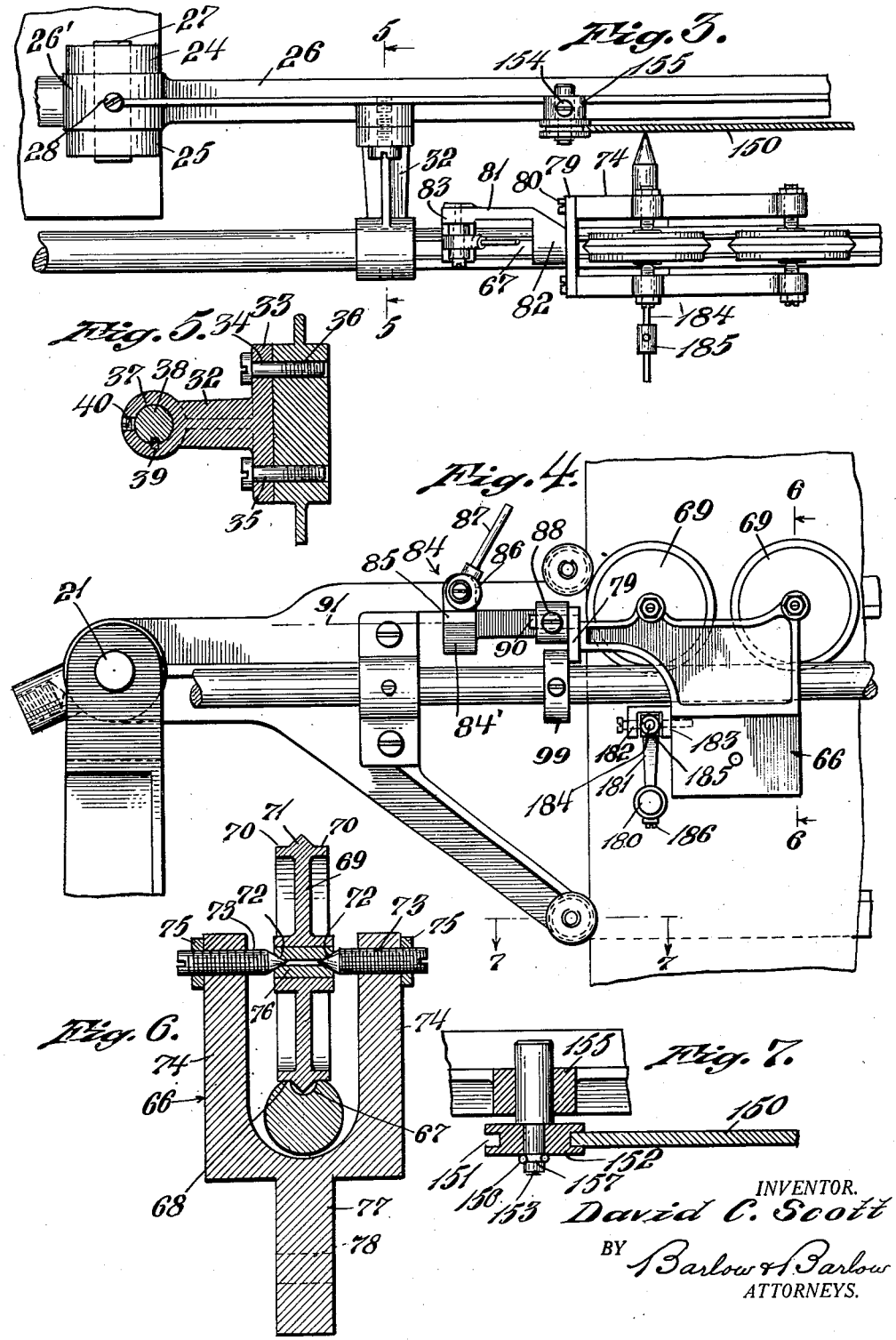
INVENTOR.
David C. Scott
BY Barlow & Barlow
ATTORNEYS.

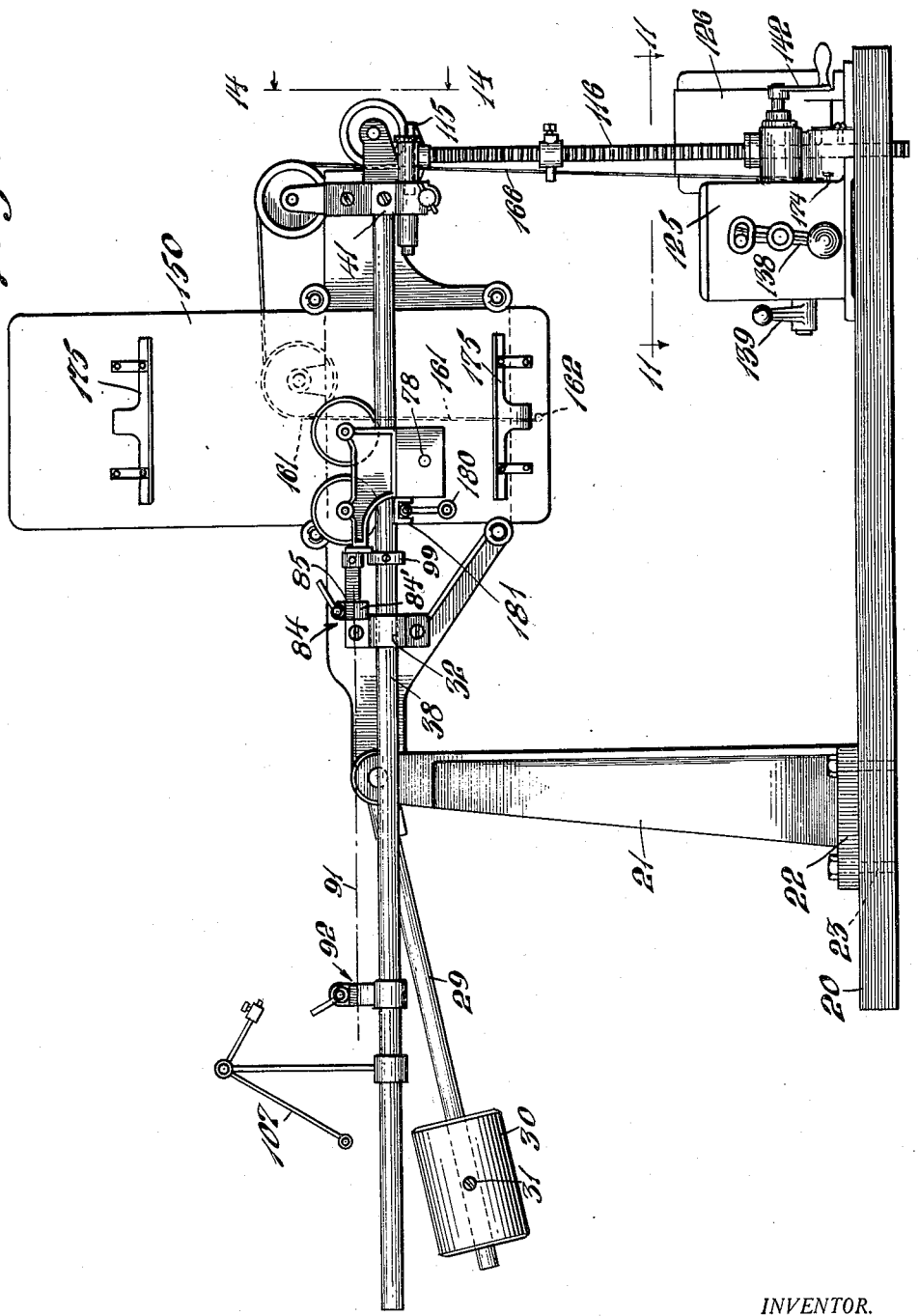

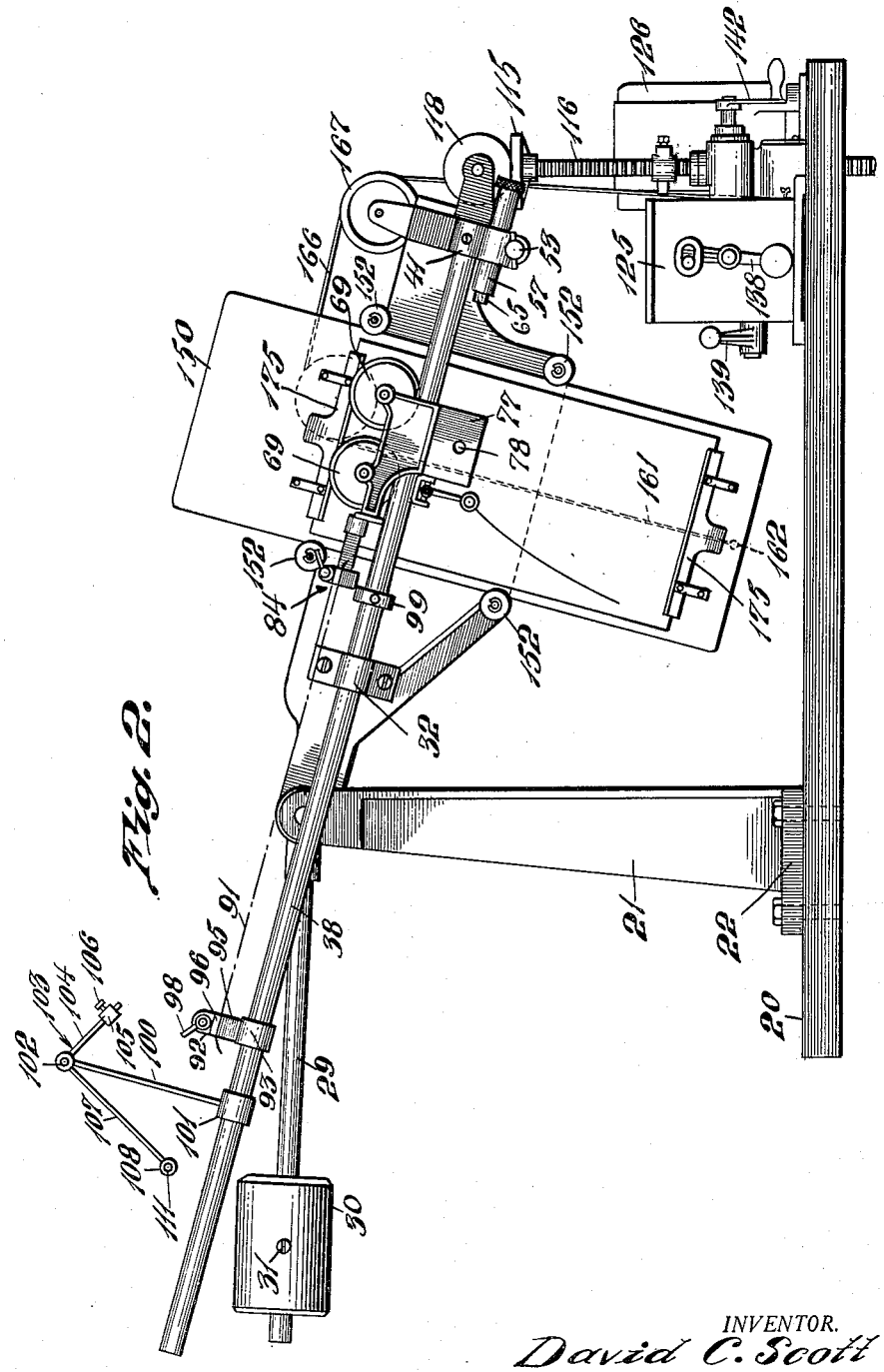

June 25, 1940.  D. C. SCOTT  2,205,579

TESTING MACHINE

Filed Dec. 7, 1937  5 Sheets-Sheet 4

INVENTOR.
David C. Scott
BY Barlow & Barlow
ATTORNEYS.

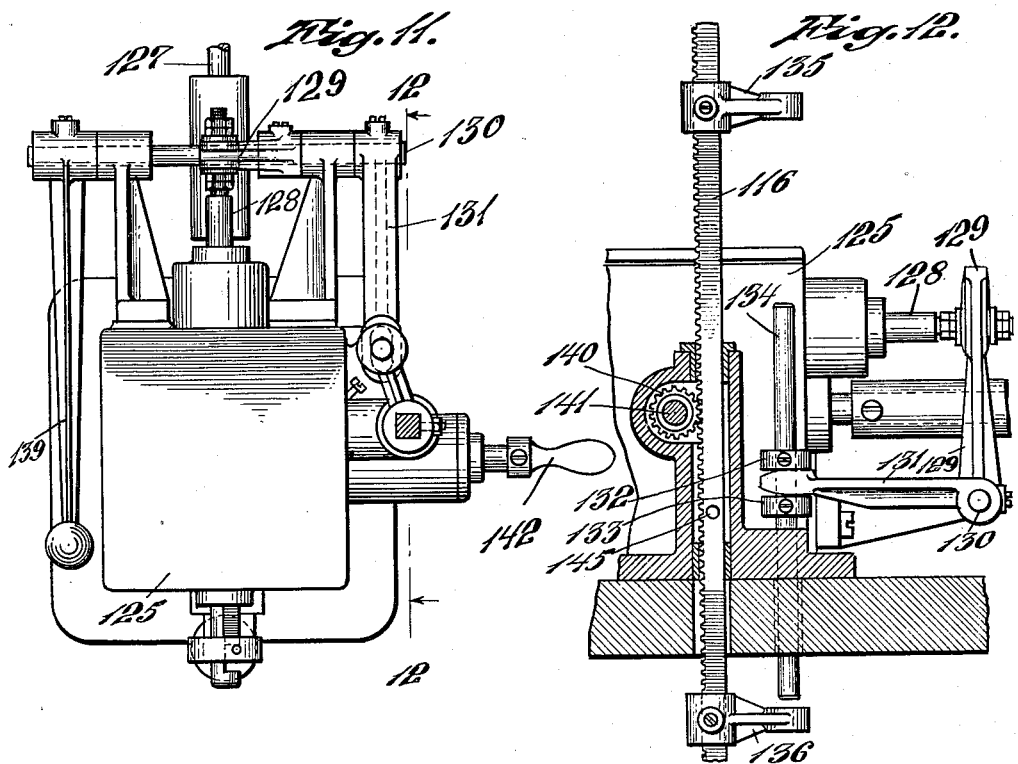
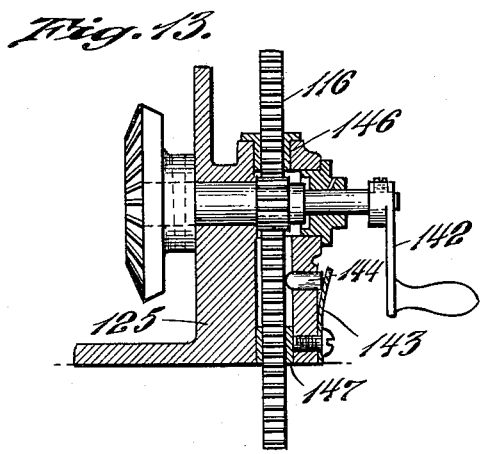
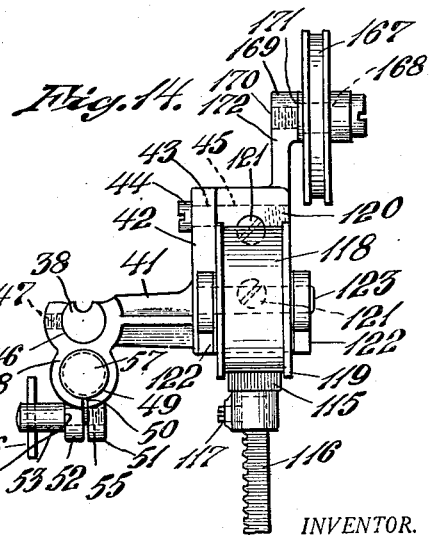
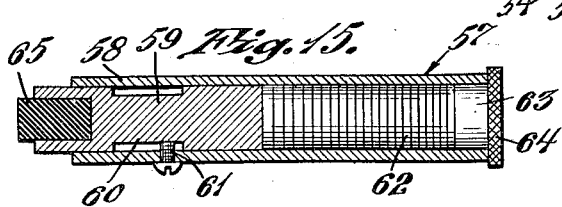

Patented June 25, 1940

2,205,579

UNITED STATES PATENT OFFICE 2,205,579

TESTING MACHINE

David C. Scott, Providence, R. I., assignor to Henry L. Scott Company, a corporation of Rhode Island Application December 7, 1937, Serial No. 178,473

14 Claims. (Cl. 265—2)

This invention relates to a machine for testing the strength and stretch of materials; and has for one of its objects the provision of a machine which may be operated in a sufficiently simple manner to be capable of use by unskilled persons.

Another object of the invention is to provide an apparatus for testing the elongation, hysteresis or fatigue of any sample at any point in the load for any number of repeated cycles, the controls being such that the tests may be carried to the breaking point of the sample at any time desired.

Another object of the invention is the provision of an arrangement by which the capacity of the machine may be easily and quickly varied as desired for different strength samples.

Another object of the invention is an arrangement so that the rate of application of the load to the specimen will be uniform although this rate may be varied to apply the load more quickly or more slowly to the specimen in accordance with different specifications and the size of the specimen.

Another object of the invention is the provision of a means so that all specimens or samples will be loaded into the machine under the same tension conditions.

Another object of the invention is the clamping of the specimen in working position in such a manner that it may be readily moistened or wet after loaded into the machine for more uniformity in testing wet or moistened specimens.

Another object of the invention is the positive moving of the support for the carriage and the instantaneous reverse so that the stretch and recovery of the specimen may be determined throughout a desired number of cycles of application of the same or a different weight or pull upon the specimen.

Another object of the invention is the recording of the characteristics of the specimen by substantially eliminating all friction from pen carrying arrangements.

Another object of the invention is to provide a recording mechanism which will be carried by the inclined track so that the movement of the pen on the carriage which runs on the track will always be at right angles to the movement of the chart so that a true formed graph will be provided.

Another object of the invention is to produce a permanent record of the elongation, recovery, permanent loss and ultimate tensile strength of the specimen under observation and the automatic record of the entire action of the material while the test is in process.

With these and other objects in view, the invention consists of certain novel features of construction, as will be more fully described, and particularly pointed out in the appended claims.

In the accompanying drawings:

Fig. 1 is a side elevation of the apparatus constructed in accordance with this invention showing the track in horizontal position at the commencement of the test process;

Fig. 2 is a view similar to Fig. 1 but showing the track in inclined position, which position is assumed as the process is well under way and near completion showing the mark on the chart which the pen has made;

Fig. 3 is a top plan view of a fragmental portion of the apparatus showing a part of the carriage mounting and a part of the platen mounting;

Fig. 4 is an elevation of the fragmental portion shown in Fig. 3;

Fig. 5 is a sectional view on line 5—5 of Fig. 3;

Fig. 6 is a sectional view on line 6—6 of Fig. 4 showing the carriage mounting;

Fig. 7 is a sectional view on an enlarged scale through the platen mounting showing one of the rotatable guide wheels for the platen;

Fig. 11 is a top plan view on substantially line 11—11 of Fig. 1 of the operating mechanism for the track tilting control and showing the rack in section;

Fig. 12 is a sectional view on substantially line 12—12 of Fig. 11;

Fig. 13 is a sectional view showing the relation of the rack, the handle and gear for operating the same and the bevel gear which is inside of the casing and through which motion is applied;

Fig. 14 is a view looking in the direction of the arrows on line 14—14 of Fig. 1 and showing the relationship of the track, frame and rack which supports the frame in position;

Fig. 15 is a sectional view of the bumper for cushioning the carriage upon its descent along the track;

Figure 8:
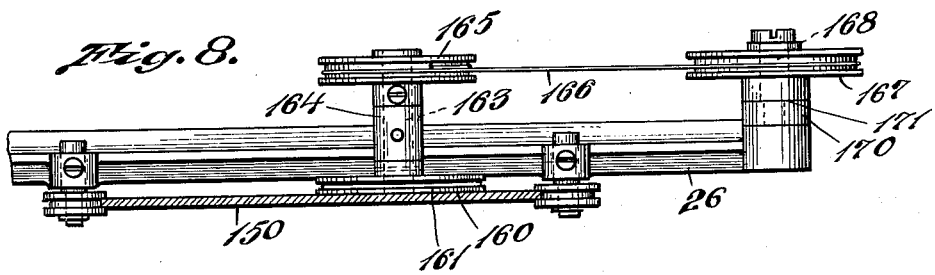
Fig. 8 is a top plan view of the platen mounting and control for the platen in its movement relative to the track.

In testing materials such as textile materials, especially rayon and the like it is found that the tests of these materials have heretofore been the subject of considerable variation in different machines of the pendulum type where the load which moves through the arc of a circle varies by reason of the arc of the circle which is described by the pendulum weight. It is also found that the time element in the application of the weight to a specimen is of importance as well as the length of the specimen which is being tested. For instance, it is very definitely now determined that the quicker the weight is applied to a textile material the greater the breaking strain will be obtained which is due probably to the frictioning of the fibers one past the other which may gradually permit elongation where the load is very gradual but which resists any quick tendency to pull them apart. It is also very well determined that the shorter the length of specimen tested the greater will be its apparent breaking strength. Thus specifications including these relationships must be formulated if comparative tested are to be had. Also, in order that a chart may be formed from which the desired characteristics of a specimen may be predicted it is desired that the curve characteristic of the specimen take a certain general shape, and with consideration of the above it is of advantage to provide an apparatus in which the weights may be changed for each size specimen tested so that a set of weights for one size specimen may be provided for one size yarn and a different set of weights may be provided for a different size yarn, and with the present apparatus this may be readily accomplished.

It is also desirable that the tension be stopped after a certain elongation has been had of the specimen and the weight or tension on the specimen relieved gradually or in the same amount that it was applied so that a recovery of the specimen from elongation may be determined, and with the present machine this may be accomplished and the same may be passed through as many cycles as desired with the same or varying loads and an accurate record produced of the behavior of the specimen of each one of these cycles so that say for instance after the third stretching the exact recovery may be seen, and if it is desired that at any time in these cycles that the specimen be broken this may be done, and I have provided that all of these factors may be determined in this machine, the loading and unloading arrangement for the same amount of weight being automatic so as to take place at the same point with positive and exact reverse precision as desired.

For all tests I have arranged that the specimen may be loaded into the machine under exactly the same tension conditions each time that the tests may be accurately comparative; and the following is a more detailed description of the present embodiment of this invention, illustrating the preferred means by which these advantageous results may be accomplished:

With reference to the drawings, 20 designates a support which may be a table or bench of some suitable character. A standard 21 is bolted through its base 22 by bolts 23 to this support, the standard being of suitable angle iron structure to provide suitable rigidity and strength with minimum weight. The upper end of this support is bifurcated providing spaced bearings 24 and 25 and between these bearings is positioned the portion of a frame 26 supported on the pivot pin 27 which extends through the bearings 24 and 25 and the portion 26' of this frame which receives the pin 27. This pin is fixed to the frame 26' by a set screw 28 so as to be rockable with this frame and movable in the bearings 24 and 25. This frame 26 carries the platen for the chart, the track and a carriage movable along the track, all on one side of its pivot and is counter-balanced by means of an arm 29 extending on the other side of its pivot which adjustably supports the weight 30 held in position by the set screw 31 so that the weight may be moved along this arm to provide the desired counter-balance for the frame and the mechanism carried thereby.

A bracket 32 has a base portion 33 provided with openings 34 for the reception of bolts 35 to extend through these openings and secure the bracket to the frame 26 by means of the bolts threading into openings 36 in the frame. This bracket is provided with an opening 37 for the reception of the track 38 which is keyed for sliding in this opening by the feather 39 and secured in position therein by the set screw 40. Another bracket for this track is shown at 41, see Fig. 14, which consists of a base portion 42 having an opening 43 for the reception of the bolt 44 passing through this opening and threaded into the threaded opening 45 in the frame. This bracket has an opening 46 for the reception of the track 38 which is held in position in this opening 46 by a set screw 47. The upper portion of the bracket 41 is cut away as shown so as to leave the supporting surface of the track protruding above it, as is apparent in Fig. 14. This bracket 41 also includes a lower depending portion 48 having an opening 49 therein which is slit as at 50 and provided with ears 51 and 52 which may be moved toward each other by the pin 53 having a shoulder 54 abutting the ear 52 and having a threaded portion 55 engaging the threaded ear 51 so that when this pin 53 is turned by means of the handle 56 the ears are brought toward each other and the opening 49 is contracted so as to grip a cylindrical bumper 57 which is positioned in this opening 49.

This bumper 57 is illustrated in detail in Fig. 15 and consists of a metallic tube 58 having a plunger 59 slidable therein for a limited distance. The length of movement of the plunger is governed by the length of neck 60.

The screw 61 extends through an opening in the tube 58 to enter this reduced portion and abut the shoulders at the opposite ends of this neck. This plunger 59 is backed up by sponge rubber 62 supported from one end by a plug 63 having a flanged head 64 and is provided with a rubber cushion 65 at the outer end to be contacted by the carriage which is mounted upon the track 38.

Track 38 receives between its support brackets 32 and 41 a carriage which is designated generally 66, see Figs. 4 and 6. This track along the length traveled by the carriage, which is the distance primarily between these brackets, is grooved as at 67, see Fig. 6, in an arcuate form and each side of the groove is provided with a flat surface 68. This flat surface is in a plane passing through the axial center of the pivot pin 27 about which the track swings in inclining, whereby the supporting surface on the track always passes through this axial center. Wheels 69 each have flat surfaces 70 at their opposite edges to contact the flat surfaces 68 of the track and is provided with a V formation or rib 71 between these surfaces 70 which is of a size at its juncture with the flat surfaces of substantially the distance that the flat surfaces 68 are apart so that this V rib will enter the groove 67 and will prevent lateral movement of the wheel on the track. Two of these wheels 69 are provided for rolling on the track and suspend the carriage 66 from them by means of conical pivots 72 at the ends of threaded members 73 extending through the spaced portions 74 of the carriage 66, these being held in adjusted position by the check nuts 75 and engaging the hardened bushing 76 of each wheel 69. The lower portion of this carriage 77 is provided with an opening 78 for the reception of additional weights which may be applied to the carriage to add to its effective weight when the capacity of the machine is desired to be changed.

Bridging the bifurcated portion 74 of the carriage at one end is a plate 79 which is shown in Fig. 3 as being screwed to the bifurcated portions as at 80 with a stud 90 extending therefrom, see Fig. 4. There is provided a generally U-shaped bracket 81 with an enlarged portion 82 forming one of the sides of the U which has an opening therein to receive the stud 90 and is held thereon by a screw 88. An arm 83 at the other end of the bracket forming the other side of the U is equipped with a clamp 84 comprising a fixed jaw 84' and a movable jaw 85 which is controlled by the cam 86 and handle 87 for engaging and clamping thereto one end of the specimen to be tested.

Figure 9:
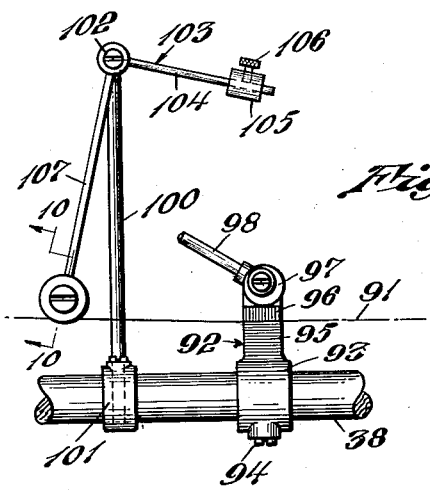
Fig. 9 is a fragmental elevational view of the means for applying a uniform load upon the specimen as it is positioned on the machine.
Figure 16:
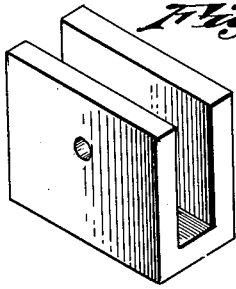
Fig. 16 is a perspective view of a weight to be added to the carriage.

The other end of the specimen designated generally 91 is secured to a clamp device designated generally 92 which is shown in detail in Fig. 9 and consists of an embracing portion 93 extending about the track 38 and clamped in position by set screw 94 having one fixed jaw 95 and a movable jaw 96 which is operated by a cam 97 and handle 98 for binding the specimen 91 in position.

Figure 10:
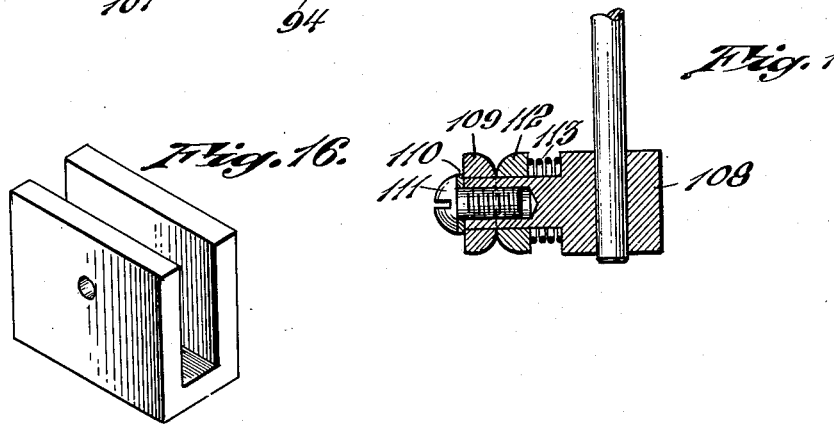
Fig. 10 is a sectional view on line 10—10 of Fig. 9.

I also provide for uniform tension in loading by means of an upstanding rod 100 secured by means of an embracing portion 101 on the track 38 to serve as a support for a pivot 102 for the bell crank lever 103 consisting of an arm 104 with a weight 105 thereon adjustable by means of the thumb nut 106 along the arm 104 extending from the pivot, while the other arm 107 supports at its outer end a block 108 which has a clamping jaw 109 held at one end by means of the washer 110 and screw 111, while there is an adjustable jaw 112 moved into engagement with the jaw 109 by a spring 113, see Fig. 10. These jaws are so arranged at the end of arm 107 that the specimen when clamped by them will extend substantially in line with the surface of the fixed jaw 95 of the clamp 92; and in order that the machine may be loaded under similar conditions at all times the carriage is positioned against the adjustable abutment 99 on the track 38 with one end of the specimen secured in the clamp 84, as illustrated in Figs. 1, 2 and 4. The other end of the specimen is then engaged by the jaws 109, 112 and the bell crank arm is permitted to rock to place the specimen under a certain amount of tension, and then the clamp 92 is set up on the specimen so that when all specimens are loaded in this manner they will be loaded under similar tension conditions.

As the weight 30 is but a partial counterbalance the frame 26 with the track and mechanism mounted thereon will tend to move downwardly by gravity on its side of pivot 21. The frame, however, is supported in position against this action of gravity by a platform 115 held on the end of rack 116 by set screw 117, as shown in Fig. 14. The support of the frame exists through a roller 118 having flanges 119 extending on either side of the platform 115 so as to assist in guiding it against any lateral movement. This roll is supported by a bracket 120 which is secured by means of screws 121 to the end of the frame. This bracket 120 is provided with spaced ears 122 which support a pin 123 upon which the roll 118 is rotatably mounted.

Rack 116 is controlled in its movement by a gear box 125 and motor 126. This motor is an electric motor as shown and is connected to the gear box through a reducing mechanism (not shown) and drive shaft 127 shown in Fig. 11. A clutch operating shaft 128 extends from the gear box and there is operated by a lever 129 fixed on shaft 130 which may be rocked in its bearings for the forcing inwardly of the shaft 128 or the movement outwardly of this shaft for the control of the clutch. In order that this clutch may be automatically controlled the lever 131 which is also fixed to shaft 130 is located to be moved by the abutments 132 and 133 on the rod 134, as shown in Fig. 12. This rod is located to be in the path of movement of actuating arms 135 and 136 on the rack so that upon movement downwardly of the rack to a certain extent the rod 134 will be moved by the arm 135 to throw the bell crank lever in a manner to either stop or reverse the operating gears in the casing 125, depending upon whether the handle 138 is in one of two positions either for a reverse or for neutral, the latter causing the rack to stop in its lower position, while the former will cause the rack to again move upwardly.

The starting handle for the gears is designated 139, while the pinion 140 on operating shaft 141 may be controlled also manually by a crank 142 when desired. Friction is applied to the rod 116 by means of spring 143 and pin 144, which pin may extend into the recess 145 of the rack to hold the rack in one extreme as in its lower position. This rack is guided by squared bearings 146 and 147 that its motion may be nicely controlled.

In order that a record may be made of a test of the specimen in the machine a platen 150 is mounted in the grooves 151 of four rolls 152 freely rotatable upon pins 153 secured as at 154 in bosses 155 of the frame, these grooved rolls being retained in position by a spring wire 156 positioned in groove 157 on the pin 153. This platen is free to descend by gravity in this freely guided position. Two of these rolls on one side may be mounted eccentrically on the pin so as to slightly adjust their position with reference to the other rolls for accommodation of the platen in a known manner.

In order to control the free downward movement by gravity of this platen I have provided a drum 160 supported on shaft 163 which has a cord 161 coiled about the drum and fastened as at 162 to the lower portion of the platen. The platen, see Fig. 8, tends to rotate the drum in one direction and when such rotation occurs the platen is permitted to descend by gravity. If the drum is rotated in the opposite direction the platen is hoisted up to a higher position, such as that shown in Fig. 1. This drum 160 is at one end of a shaft 163 rotatable in bearing 164 supported on frame 26 with a drum 165 also fast upon this shaft 163 at its other end. A cord 166 is coiled about the drum 165, and extends over a pulley 167 freely rotatable upon the pin 168 mounted in the bracket 169 by means of its threaded end 170 which is reduced and provides the stop shoulder 171, this bracket being at the end of a post 172 extending upwardly from the frame 26. After passing over this pulley the cord or flexible member 166 extends downwardly and is fastened as at 174 to some point adjacent the guide for the rack.

This platen 150 has spring clamps 175 to hold on it a piece of paper which usually has ordinate and abscissas lines thereon forming squares for designating the characteristics of the curve as charted by the behaviour of the specimen. A stylus 180, which is shown in Fig. 4 for marking upon this chart, is carried by the carriage in a pivotally mounted arm 181 supported between the pivot points 182 and 183 and moved toward the chart by means of a laterally extending arm 184 which carries a weight 185 and extends outwardly from the arm 181 at its pivot point so as to in effect form a bell crank lever to urge the marker 180 toward the paper. This marker may be adjusted by means of set screw 186 which holds it firmly in position.

In operation, assuming the track to be in a position with the carriage at a little higher than the pivot point of the frame 26 the carriage will then be against the adjustable abutment 99 and a specimen will be fastened in the clamp 84. The specimen will then be positioned in the temporary clamp mechanism on the end of arm 107 and after it is allowed to draw the specimen taut the clamp 92 will bind the specimen in position. The marker will then be permitted to rest against the paper and the gear mechanism will be caused to operate and lower the rack 116, permitting the track to incline and the carriage to apply weight upon the specimen.

The rack will descend at a constant rate of speed which will cause the angular movement of the track to be through a varying rate of inclination but due to the fact that the rack is descending at a constant rate of speed and the effective weight on the specimen is the product of the sine of the angle of inclination and the weight of the loading member, the load will be applied to the specimen at a constant or uniform rate of increase of pull on the specimen, and this will occur regardless of the elongation of the specimen as the movement of the carriage along the track will take up this elongation without changing the effective pull on the specimen. The elongation will be recorded on the chart by movement of the pen laterally along the chart should the carriage move along the track, while the application of the load being uniform will be recorded by the movement of the platen downwardly at right angles to the track due to its guides on the frame which moves with the track. That is, as the frame moves down the slack in the cord 166 will permit gravity to move the platen 150 downwardly and this movement will be directly as the increase of pull due to the uniformity of increase of pull, as above explained.

It is a very simple matter to operate the machine, loading it and starting its operation by the control handle 139. If it is desired to obtain a hysteresis or fatique test after a certain load has been applied to the specimen the machine will be reversed either automatically or by hand at a certain point and the load uniformly decreased by lifting of the track that the recovery of the specimen may be observed, after which the load may be again applied and this may occur as often as desired or during certain loads, as desired, and then the machine allowed to continue until a break occurs.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a testing machine, means for anchoring one end of a specimen, a normally horizontal tiltably mounted track, means for tilting the track, a carriage on the track to which the free end of the specimen is secured and tending to move along the track upon tilting of the track from a horizontal position to apply tension to the specimen increasing as the angle of tilt of the track is increased from a horizontal position, a platen for a chart, guides tiltable with the track for directing movement of the platen at right angles to the track, such movement occurring by gravity, said guides and platen being movable with the track as tilting occurs, means associated with said platen for controlling the right angular movement of said platen in accordance with the tilting of said track, and a marking means movable in response to the movement of the carriage relative to the track to record the movement of the carriage along the track.

2. In a testing machine, a tiltably mounted track, means for tilting the track from a horizontal position, a platen for a chart, means to mount the platen to move at right angles to the track and movable as a whole with the track to maintain said relation as tilting of said track occurs, said platen being movable downwardly by gravity when unrestrained, and yieldable means including a cord fixed to said platen and trained over a guide, movable with said track, and fixed to some point relative to which said track moves, whereby when the track moves the platen will move at right angles and relative to the track.

3. In a testing machine, a tiltably mounted track, means for tilting the track from a horizontal position, a platen for a chart, means to mount the platen to move at right angles to the track and movable as a whole with the track to maintain said relation as tilting of said track occurs, said platen being movable downwardly by gravity when unrestrained, a drum movable with said track, a cord fixed to said platen and trained over and fixed to said drum, and a second cord for controlling the movement of said drum.

4. In a testing machine, a tiltably mounted track, means for tilting the track from a horizontal position, a platen for a chart, means to mount the platen to move at right angles to the track and movable as a whole with the track to maintain said relation as tilting of said track occurs, said platen being movable downwardly by gravity when unrestrained, drum means movable with said track, a cord fixed to said platen and trained over and fixed to said drum means, and a second cord fixed to and trained about said drum means and over a guide, movable with said track, and fixed to some point below the track and with reference to which the track moves, whereby when the track tilts the platen will move at right angles and relative to the track.

5. In a testing machine, a tiltable track, a carriage having wheels rollable along said track with a body supported by said wheels, said track comprising spaced supporting surfaces and said wheels comprising spaced contacting surfaces to engage therewith with a guiding rib between said surfaces to engage at least one edge of one of said surfaces.

6. In a testing machine, a tiltable track, a carriage having wheels rollable along said track with a body supported by said wheels, said track comprising spaced supporting surfaces and said wheels comprising spaced contacting surfaces to engage therewith with a guiding rib between said surfaces to engage the inside edges of both of said surfaces.

7. In a testing machine, a tiltable track, a carriage having wheels rollable along said track with a body supported by said wheels, said track comprising a rod having spaced supporting surfaces with a groove between them, and said wheels comprising spaced contacting surfaces at their outer edges to engage therewith with a V-shaped guiding rib between said surfaces to extend into said groove and engage the edges of said surfaces.

8. In a testing machine, a tiltably mounted track, a carriage movable upon the track for tensioning a specimen, means for tilting the track from a horizontal position, a movable platen for a chart or the like, guides for said platen tiltable with the track for directing movement of the platen at right angles to the track, means associated with said platen for controlling the right angular movement of the platen in accordance with the tilting of said track, and a stylus carried by said carriage.

9. In a testing machine, a support, a frame and a track tiltably mounted on said support, means for tilting the track and the frame from a horizontal position, means to anchor one end of the specimen, means to apply tension on the specimen upon tilting of the track, a platen for a chart or the like bodily carried by the frame and movable transversely of the track and the frame, and means to cause relative movement of the platen and track upon tilting of the track.

10. In a testing machine, a support, a frame and a track tiltably mounted on said support, means for tilting the track and the frame from a horizontal position, means to anchor one end of the specimen, means to apply tension on the specimen upon tilting of the track, a platen for a chart or the like bodily carried by the frame and movable transversely of the track and the frame, means to cause relative movement of the platen and track upon tilting of the track, and marking means carried by the tension applying means and movable laterally of the platen for recording movement of the tension means.

11. In a testing machine, a support, a frame and a track tiltably mounted on said support, means for tilting the track and the frame from a horizontal position, means to anchor one end of the specimen, means to apply tension on the specimen upon tilting of the track, a platen for a chart or the like bodily carried by the frame and movable transversely of the track and the frame and means to cause relative movement of the platen and track upon tilting of the track, and means mounted to move with said track for pre-tensioning the specimen in loading the same into the machine.

12. In a testing machine, a support, a frame and a track tiltably mounted on said support, means for tilting the track and the frame from a horizontal position, means on the track to hold and to apply tension to the specimen, a platen for a chart or the like carried by the frame and movable with the track and frame as tilting of the same occurs to maintain a constant angular relation therewith, said platen being movable in an angular relation transversely of said track, and means to control the rate of transverse movement of the platen relative to the track as tilting occurs.

13. In a testing machine, a support, a frame and a track tiltably mounted on said support, means for tilting the track and the frame, means for anchoring one end of a specimen, a carriage on the track to which the other end of the specimen is secured and tending to move along the track upon tilting of the track from a horizontal position to apply tension to the specimen increasing as the angle of tilt of the track is increased from a horizontal position, a platen for a chart mounted on the frame to be tiltable with the track and the frame and movable transversely of the track as tilting of the same occurs, means associated with the platen for controlling the transverse movement of said platen in accordance with the tilting of said track, and marking means movable in response to the movement of the carriage relative to the track to record on a chart when placed on the platen the movement of the carriage along the track.

14. In a testing machine, a support, a frame and a track tiltably mounted on said support, said track being carried by said frame in spaced relation thereto, means for tilting the track and the frame from a horizontal position, means to anchor one end of the specimen and carried by the track, means movable along said track in response to tilting of the track to apply tension to the specimen, a platen for a chart or the like bodily carried by the frame and movable transversely of the track and the frame, means to cause relative movement of the platen and the track upon tilting of the track, and marking means projecting from the tension-applying means and in cooperating relation with the platen for recording movement of the tension means.

DAVID C. SCOTT.